Nov. 17, 1942.         J. C. RAUSCHER         2,302,056
                         SEED PLANTER
              Filed Dec. 30, 1938        3 Sheets-Sheet 1
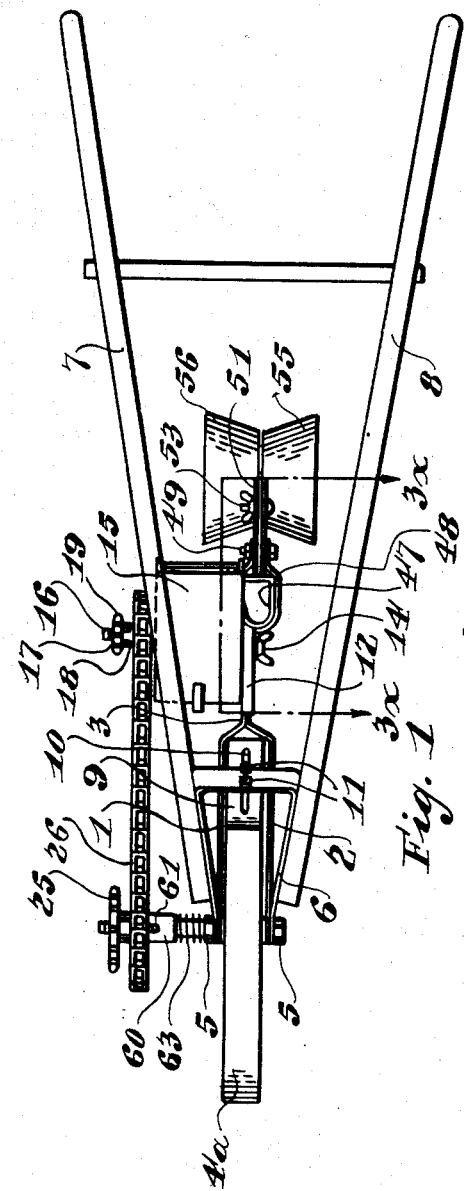
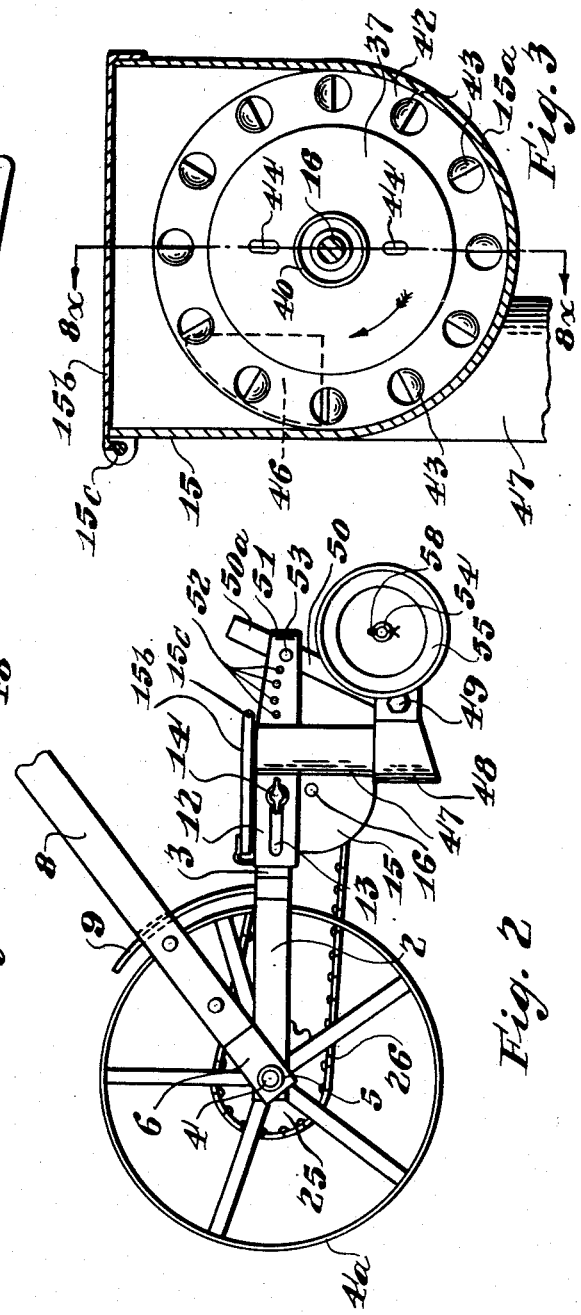
INVENTOR
Joseph C. Rauscher
BY
Frank Keifer
ATTORNEY

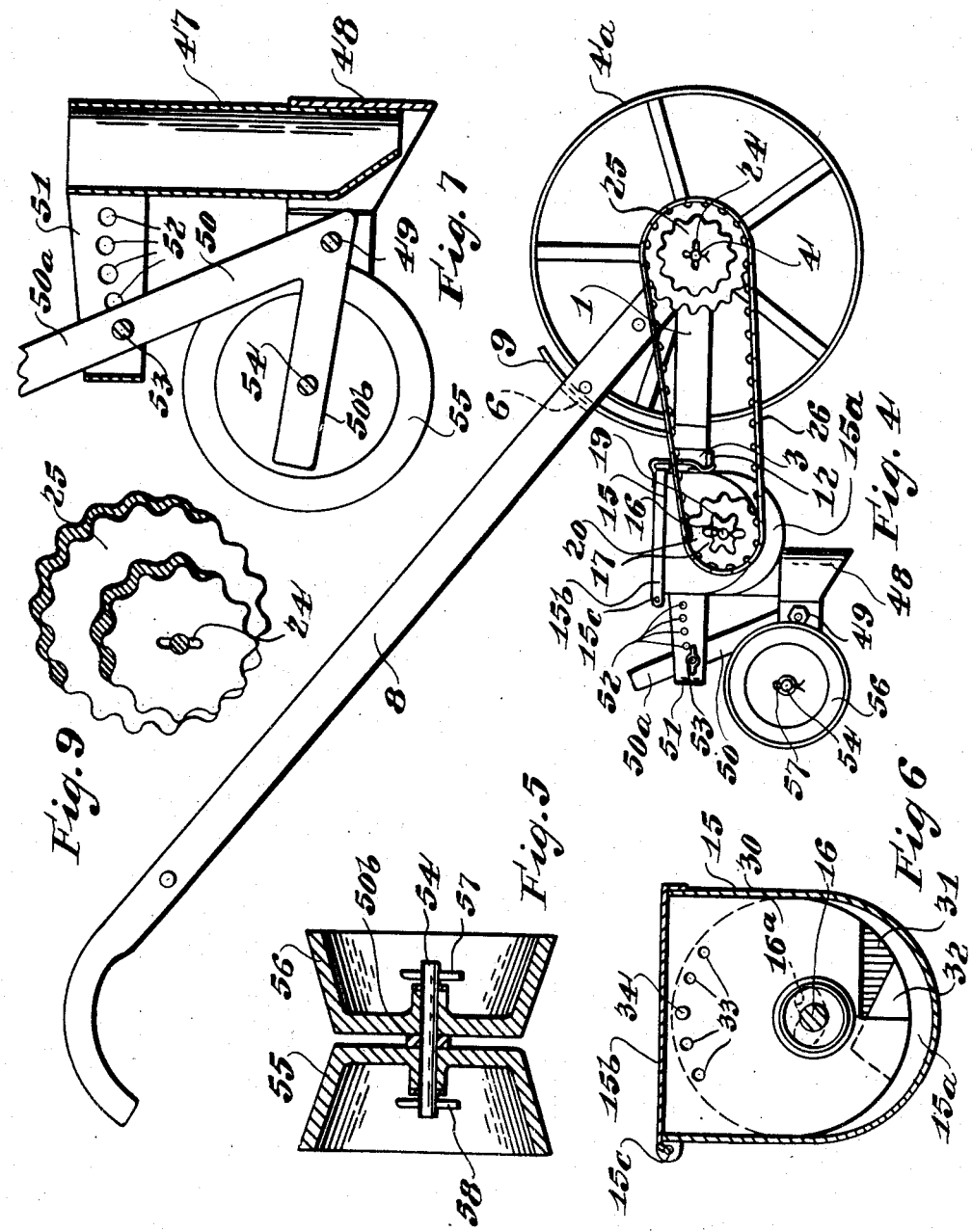

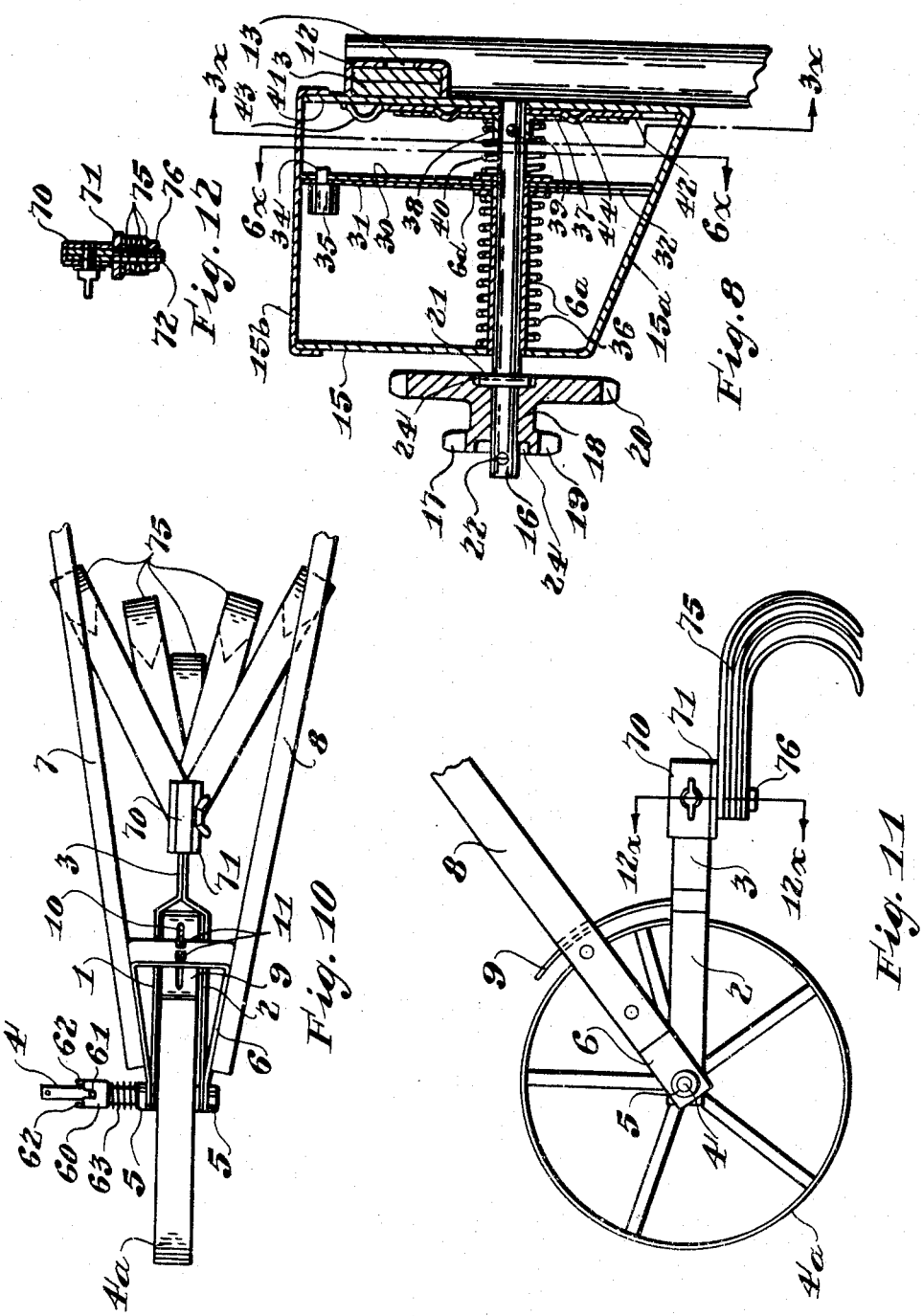

Patented Nov. 17, 1942

2,302,056

UNITED STATES PATENT OFFICE 2,302,056

SEED PLANTER

Joseph C. Rauscher, Springwater, N. Y.

Application December 30, 1938, Serial No. 248,450

3 Claims. (Cl. 221—135)

The object of this invention is to provide a machine for planting seed in measured quantities.

Another object of the invention is to provide a machine having a frame supported at one end by a drive wheel and supported at the other end by rollers, said frame supporting a seed hopper between the drive wheel and the rollers.

Another object of the invention is to provide a hopper with a plate or disc rotating in the hopper to measure and feed the seed, which disc is driven from the drive wheel by a chain and other suitable gearing.

Another object of the invention is to provide means by which the seed are planted in the soil at regular intervals, and are then covered.

Another object of the invention is to provide interchangeable gearing for controlling the speed ratio of the feeding of the seed.

Another object of the invention is to provide adjustable means for controlling the depth of the furrow in which the seed is planted.

Another object of the invention is to provide a machine with a frame on which a cultivator is interchangeable with the seed hopper; that is, the seed hopper can be removed and the cultivator substituted therefor.

These and other objects of the invention will be illustrated in the drawings, described in the specification, and pointed out in the claims at the end thereof.

In the drawings:

Figure 1 shows a top plan view of the seed planter.

Figure 2 is a side elevation of the seed planter shown in Figure 1.

Figure 3 is a vertical longitudinal section through the seed hopper, the section being taken on the line 3x—3x of Figures 1 and 8.

Figure 4 is a side elevation of the seed planter, viewed from the side opposite to that shown in Figure 2.

Figure 5 is a sectional view of the roller.

Figure 6 is a longitudinal section through the seed hopper, the section being taken on the line 6x—6x of Figure 8.

Figure 7 is a detail view showing the roller in end elevation and the planting tube and shoe in vertical section.

Figure 8 is a sectional view of the seed hopper, the section being taken on the line 8x—8x of Figure 3.

Figure 9 is a perspective view of one of the double sprocket wheels.

Figure 10 is a top plan view of the seed planter as it would appear after the hopper is removed and the cultivator is substituted therefor.

Figure 11 is a side elevation of the cultivator as it appears in Figure 10.

Figure 12 is a sectional view of the frame and cultivator bars and king bolt for fastening them in place, the section being taken on the line 12x—12x of Figure 11.

In the drawings like reference numerals indicate like parts.

In the drawings is shown the frame comprising the two parallel side bars 1 and 2 suitably spaced apart, which bars are joined together in one bar, as indicated at 3, in a rigid structure. The forward ends of these bars are perforated and the wheel shaft 4 goes through them. This shaft is supported by the wheel 4a which is keyed to the shaft and drives it. Suitable bushings 5 are interposed between the shaft and the bars. Also supported on the bushings is the yoke-shaped strap 6, to which the converging handles 7 and 8 are fastened. Supported on the frame 1 and 2 is provided the guide bracket 9, which is arcuate in shape and which engages on the under side of the intermediate part of the yoke-shaped strap 6. This guide bracket 9 has a slot 10 therein with which engages bolts 11 which pass through the strap 6 and by which the two parts are clamped together. This bracket supports the yoke in a wide range of angular positions and gives to the handles 7 and 8 the desired elevation. On the bar 3 slides a rectangular sleeve 12, in which is provided a slot 13. Through this slot and through a suitable hole in the bar 3 extends a bolt 14 by which the sleeve and the bar are rigidly clamped together in any desired position, it being understood that the slot 13 permits the sleeve 12 to be adjusted back and forth on the bar 3, the purpose of which will presently be described.

Rigidly fastened to the sleeve 12 is the hopper 15, in which the seed are carried. The sleeve and hopper are adjusted back and forth on the bar 3 together. The hopper carries a shaft 16, on the outer end of which is carried a double sprocket wheel 17 having a hub 18, and a small sprocket gear 19, and a large sprocket gear 20, the hub and the two sprocket gears being all cast in one piece.

In the shaft 16 is a hole through which passes a pin or key 21. On this shaft is a sprocket 17, across each end of which is a long, narrow slot or recess 24, which slots are parallel to each other. The slot on the inner end of this sprocket engages with the pin 21 and holds the gear and shaft together in angular movement, so that they both rotate together. Through the shaft 16 at right angles to the key 21 passes another hole, in which a cotter pin 22 is inserted to hold the sprocket engaged with key 21 and against endwise movement on the shaft. When the slot at one end of the sprocket wheel is in engagement with the key 21 the cotter pin 22 cannot engage with the slot on the other end of the sprocket wheel, because the pins 21 and 22 are at right angles to each other. The shaft 4 has pins placed thereon similar to the shaft 16, and the sprocket gear 25 has slots on each end similar to the sprocket wheel 17. These sprocket gears are reversible on their shafts and are interchangeable on the two shafts for the purpose of changing the gear ratio. Either end of either hub can be locked on the pin 21, it being understood that it is desirable to reverse the double sprocket wheel 17 on the shaft 16 in order to secure the correct gear ratio, and when the double sprocket wheel 17 is reversed, the cotter pin 22 will not engage in the slot but will always engage on the end of the hub, because the slots are at right angles to each other and the pin holes are parallel to each other.

On the wheel shaft 4 is also provided a double sprocket wheel 25, which also has a hub and two sprocket gears integral therewith. It will be understood that the double sprocket wheel 25 can be reversed on the shaft 4 and that the sprocket gear 25 is interchangeable with the sprocket gear 17, and that the sprocket gear on the feed hopper is driven by the sprocket gear on the wheel shaft by a sprocket chain 26, which can engage with the teeth on either sprocket gear, so that in this way a number of combinations of gearing can be secured. In this way a great variation in the angular velocity of the seed plate can be secured, which seed plate will presently be described.

The adjustment of the hopper forward and back on the bar 3 makes it possible to take up any slack that may be in the chain.

As shown in Figure 6, the shaft 16 is concentric with the curved bottom of the hopper, at the right hand end of the hopper and is eccentric to the bottom of the hopper at all other places. The bottom of the hopper has the shape of a cylinder slightly modified which may be described as follows: I will assume that a series of discs are placed on top of each other, all of said discs being concentric to the common axis. Then the discs are slightly skewed so that the axis of the discs is tilted, and a new axis is then put through the series of discs corresponding to the axis of the bottom disc. The new axis will be eccentric to all of the discs except the bottom one. The edge of the stationary diaphragm 30 makes a close fit with the flat sides and the curved bottom of the hopper all around, and is spot welded to it in places. The edge of the adjustable diaphragm or plate or disc 31 makes a close sliding fit with the curved bottom of the hopper at all times. The shaft 16 goes through both diaphragms.

It is obvious that the circular diaphragm or plate 31 cannot turn on the shaft 16 without binding if the shaft went through merely a circular hole that made a close fit with the shaft. To permit the plate on turning to adjust itself to the fixed shaft, the plate 31 has a curved slot 16a therein through which the shaft passes. This curved slot is shown in dotted lines in Figure 6, and is needed because the shaft 16 cannot pass through the center of the plate. This curved slot is covered by a washer 6d, against which the spring 36 bears. The plate 31 turns on the sleeve 6a, which surrounds the shaft 16.

The two diaphragms are each provided with like openings therein as indicated at 32. The opening in the stationary diaphragm 30 is cut on one side on a line that is radial to the center of the shaft 16. The corresponding line of the opening in the diaphragm 31 is also radial to the center of the shaft 16 when the opening in the adjustable diaphragm is moved to register with the opening in the stationary diaphragm is important because it secures the drainage of the last seed in the large hopper, when the adjustable diaphragm is in any but closed position.

As shown in Figure 6, the shaft 16 is located centrally in the slot 16a when the opening 32 is about half open. When the opening 32 is wide open, the shaft will be at the left hand end of the slot, and when the opening is fully closed the shaft will be at the right hand end of the slot.

The diaphragm 31 can be adjusted on the diaphragm 30 so as to increase or decrease the size of the opening 32 as indicated in Figure 6, which opening controls the level of the seed in the small hopper. In the stationary plate 30 is provided five holes, 33, and in the moving plate is provided a pin 34 having the large end 35 thereon. This pin is welded to the plate 31. The plate 31 is pressed against the plate 30 by a helical spring 36. The plate and pin together can be moved to the left to disengage the pin from the plate 30, so that it can be moved to another position in which the pin will again engage with a hole in plate 30, and thus fasten the two plates together, and in this way the opening 32 that is common to the two plates can be varied at will. The plates 30 and 31 divide the hopper into two bins, each of which has a sloping bottom 15a along which the seed are fed through the opening 32. On top of the hopper 15 is placed a cover 15b, hinged at 15c.

Pinned to the shaft 16 is the drive plate 37, which has a hub 38 thereon. A pin 39 fastens the hub to the shaft. A spring 40 presses the drive plate to the right. Between the drive plate 37 and the outside plate 41 of the hopper is provided the seed feeding disc 42, having pockets 43 thereon. Blisters 44 are formed on this seed plate which engage in slots in the drive plate, by which the seed plate is driven from the drive plate. As shown in Figure 8, the drive shaft 16 can be moved bodily to the left, disengaging the drive plate 37 and the shaft 16 from the seed plate 42, after which the seed plate may be removed and replaced with another plate, which will also make positive engagement with the shaft 16 and the drive plate 37 and will be driven thereby.

The seed plate 42 is shown in side elevation in Figure 3. It will be understood that a series of seed plates will be furnished with the planter, and that they will all be of the same diameter. The seed plate shown in Figure 3 has twelve pockets 43 thereon, and the other seed plates will have a larger or smaller number of pockets thereon as may be desired, and the size of the pocket will be larger or smaller, depending upon the number and size of seed of a particular kind that are to be carried up by each pocket.

It will be understood that the seed plate is driven or rotated by the drive wheel 4a through the gearing illustrated in Figures 2 and 4 and described above, and by changing the sprockets and changing the seed plates any desired number of seeds can be planted at any interval that may be desired.

The seed are carried up by the pockets 43, which slide them along the outer plate 41 of the hopper until they come to the opening 46 through which they are discharged into the planting tube 47. On the bottom of this planting tube 47 is a shoe 48, which is in the form of a strap that encircles the tube and is clamped thereon by a bolt 49. Supported on this bolt 49 is a bracket 50 having one arm extending upwardly, indicated by 50a, and another arm extending rearwardly, indicated by 50b. Extending rearwardly from the feeding tube is a bracket 51 having a series of holes therein 52. A bolt 53 is provided which goes through the bracket and the arm 50a and fastens the bracket 50 in any desired position.

A shaft 54 passes through the arm 50b and on the opposite ends of this shaft are carried the cone-shaped rollers 55 and 56. Cotter pins 57 and 58 hold the rollers on this shaft. The frame may be raised or lowered on the rollers 55 and 56 by swinging the bracket 50 and locking it in any desired position. This fixes the depth to which the shoe 48 plows the ground and forms a furrow therein, into which the seed are dropped through the planting tube 47. The shoe is so shaped that after it passes the ground will fall into the furrow and the rollers will press the ground down on the seed.

As stated above, the shaft 4 is keyed to the drive wheel 4a, so that the shaft 4 is positively driven thereby. As shown in Figure 10 a clutch member 60 in the form of a sleeve is provided. This sleeve is adapted to slide on the shaft 4 and in the position shown in Figure 10 is driven by a pin 61. On this clutch member are pins 62 which engage in the slot 24 provided on either end of the large forward sprocket gear wheel and on one side of the small sprocket gear wheel. As long as the pins 62 engage in the slot the gearing will be driven thereby and seed will be fed from the hopper. This clutch member 60 is held in driving position by the spring 63. The clutch member may, however, be moved toward the wheel and may then be turned on the shaft so that it will be held out of locking engagement with the sprocket gear, and then the shaft 4 will turn idly in the sprocket wheel and will not drive it, and with this adjustment the planter may be wheeled idly over the ground without any seed being fed from the hopper.

As shown in Figure 10, the hopper and its sleeve may be removed from the bar 3 and a similar sleeve 70 may be inserted on the bar 3. This sleeve 70 is welded to a plate 71 in which a stud 72 is welded so as to form an integral part therewith. On this stud is assembled the spring cultivator teeth 75 which are shown in side elevation in Figure 11 and in top plan view in Figure 10. These teeth are fastened on the stud by a nut 76, and when the parts are put together in this way the planter becomes a cultivator and can be used as such. The teeth can be swung sideways on the stud 72 so as to be in line with each other as shown in Figure 11, or so as to be spread out at an angle that may be desired as shown in Figure 10, and the nut 76 will clamp them in the desired position. As shown in Figure 11 these teeth 75 all strike the ground at the same level and at substantially the same angle, and they are curved to secure this result.

When the seed planter has been assembled as above described, seed is put in the left hand bin of the hopper, as shown in Figure 8, and the opening 32 is adjusted to the size desired, and the seed planter is then wheeled along the ground. The wheel 4a will turn, and this in turn will drive the gearing and turn the seed plate 42, the pockets of which will each pick up the desired number of seed and will carry them up and drop them into the planting tube 47. The shoe 48 will form a furrow into which these seed will be dropped at regular intervals, and after the shoe has passed the dirt will fall in over the seed and will be pressed down thereon by the rollers 55 and 56.

When desired, the seed hopper can be removed and the gearing can be made idle, as above described, by shifting the clutch 60, and the cultivator teeth may be put in place and the device may then be used as a cultivator.

This application contains an improvement on the seed planter shown in my prior application Serial No. 187,241, filed January 27, 1938.

I claim:

1. In a seed planter a hopper having a horizontal axis, a sloping curved bottom in said hopper, a stationary wall at each end of the hopper, a shaft supported to rotate in said end walls, a seed plate driven by said shaft and rotating therewith, said plate bearing against the end wall at the lower end of the sloping bottom, said plate having circular openings near the periphery thereof, cups having about one-fourth of the segment of the sphere formed in said openings, said cups projecting inwardly into the hopper, the circular openings being closed on the opposite side by the stationary wall of the hopper, each of said cups being adapted to pick up seeds from the bottom of the hopper and carry them up, an opening in the adjacent end plate of the hopper through which the seeds are discharged by gravity.

2. In a seed planter, a hopper, a stationary wall at each end of the hopper, a shaft supported to rotate in said end walls, a drive plate fastened to said shaft, a seed plate driven by said drive plate, and rotating with said drive plate and shaft, said seed plate bearing against the end wall of the hopper, a spring for pressing the drive plate and the seed plate against the end wall and holding the drive plate in driving engagement with the seed plate, said shaft being movable endwise to disengage the shaft and drive plate from the seed plate to permit the substitution of one seed plate for another.

3. In a seed planter, a hopper having a horizontal axis, a sloping curved bottom in said hopper, a stationary wall at each end of the hopper, a fixed partition plate in the intermediate part of the hopper, an opening in the bottom of said partition, a plate oscillating on said partition having a portion cut away therefrom, which plate overlaps the opening in the partition and can be turned to increase or decrease said opening, each of said plates being semicircular on the bottom, a shaft extending through said plate, said shaft being eccentric to the curved bottoms of the plates, said oscillating plate having a curved slot therein which permits the plate to turn around the shaft and adjust itself to it.

JOSEPH C. RAUSCHER.